May 25, 1954 A. M. HILL 2,679,173
PIPE TAPPING MACHINE
Filed July 9, 1949 2 Sheets-Sheet 1
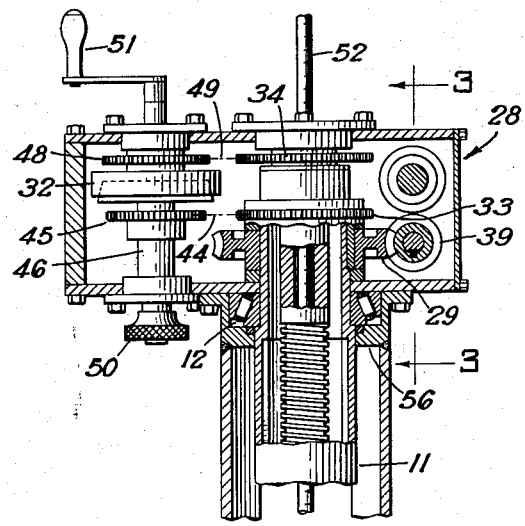
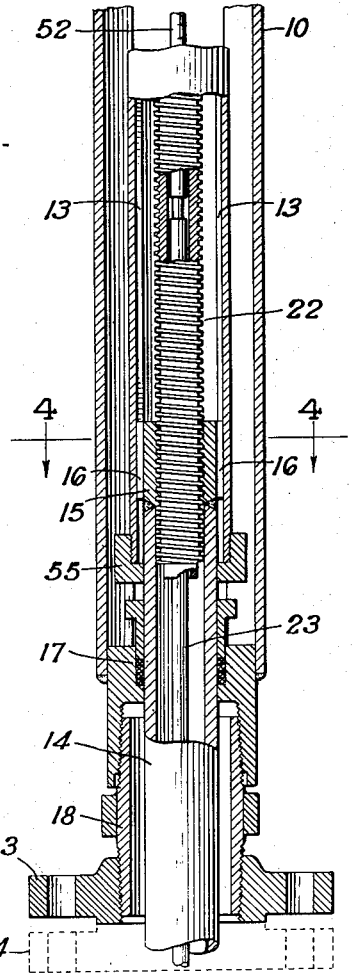
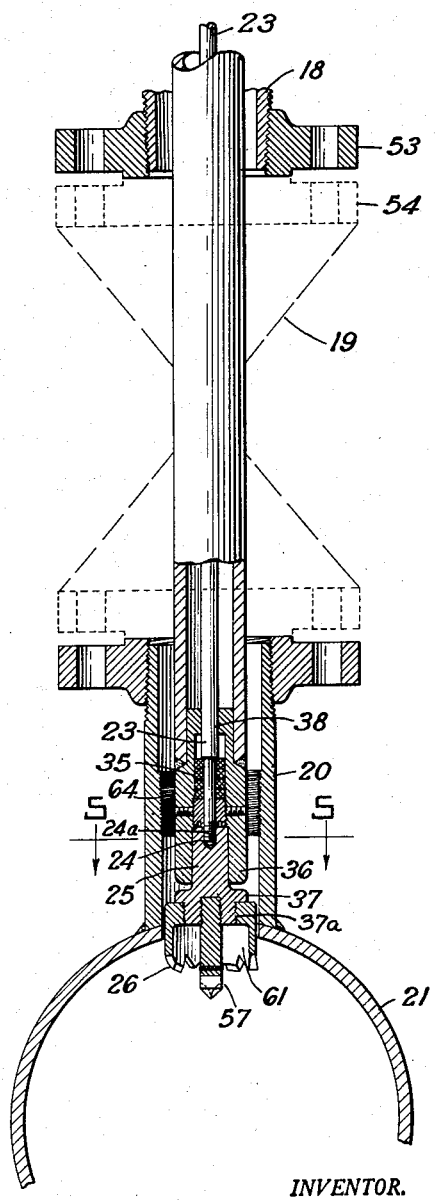
INVENTOR.
Arthur M. Hill
BY
Everett A. Johnson
ATTORNEY May 25, 1954          A. M. HILL          2,679,173

PIPE TAPPING MACHINE

Filed July 9, 1949          2 Sheets-Sheet 2

INVENTOR.
Arthur M. Hill
BY
Everett A. Johnson
ATTORNEY

Patented May 25, 1954

2,679,173

UNITED STATES PATENT OFFICE 2,679,173

PIPE TAPPING MACHINE

Arthur M. Hill, Tulsa, Okla., assignor to Service Pipe Line Company, a corporation of Maine Application July 9, 1949, Serial No. 103,781

5 Claims. (Cl. 77—37)

This invention relates to a pipe tapping and plugging apparatus adapted to tap and plug a pipe containing fluid under pressure.

An object of the invention is to provide a new and improved apparatus for tapping and plugging a pipe containing fluid under pressure without the loss of the fluid. Another object is to provide a new and improved apparatus for cutting a segment from a pipe and for withdrawing the segment therefrom.

It is a further object of my invention to provide a new and improved arrangement for advancing and retracting the boring bar of a pipe tapping and plugging apparatus which will facilitate the drilling operation conducted through a gate valve as well as the subsequent installation of a plug below the gate valve and which will permit the ready removal of both the gate valve and the drilling device after the plug is installed.

This invention has as a further object the provision of improved means for receiving interchangeably the stem of a drill and the stem of a plug. An additional object is to provide a compact and readily portable device for tapping and plugging a conduit containing fluid under pressure. A further object is to provide an improved apparatus which permits maximum travel of the boring bar but which has a minimum overall length. These and other objects of my invention will become apparent as the description thereof proceeds.

My invention will best be understood by reference to the accompanying drawing where corresponding elements are designated by like reference characters and in which:

Figures 1 and 2, taken together, is an elevation, partly in section, showing the preferred embodiment of my invention;

Figure 3:
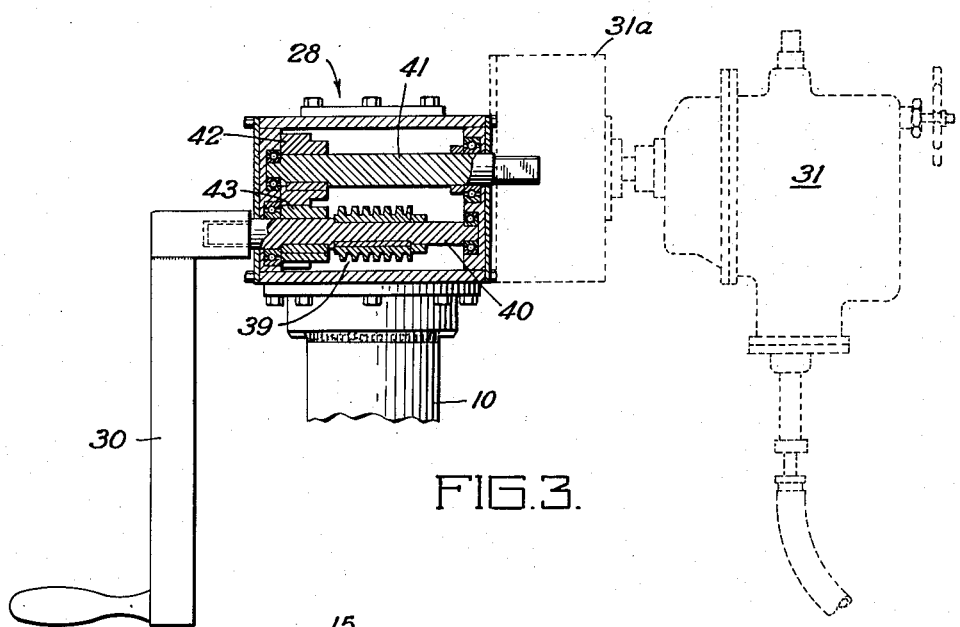
Figure 3 is a view taken along the line 3—3 in Figure 1 with some parts removed.
Figure 4:
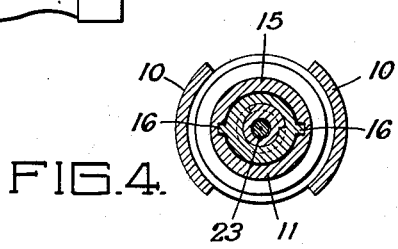
Figure 4 is a cross-sectional view taken on the line 4—4 of Figure 1 showing in greater detail the arrangement of parts.
Figure 5:
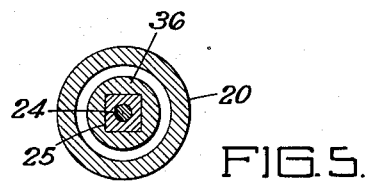
Figure 5 is a cross-sectional view taken on the line 5—5 in Figure 2.

The improved machine which is the subject of the present invention embodies telescopic principles which permit maximum travel of the boring bar and minimum overall length of the machine. In using the machine, a tapping nipple is welded to the pipe or vessel to be tapped. A gate valve is fixed to the nipple, and the pipe tapping apparatus is, in turn, attached to the top of the gate valve. The tapping tool then operates through the gate valve without the loss of fluid or pressure from the pipeline or vessel. Likewise, a plug may be removed from the nipple without loss of fluid or pressure by reinstalling the gate valve through which the plug is engaged.

Referring to the drawings, the apparatus includes an elongated skeleton frame member or body 10 within which a drive tube 11 is rotatably mounted on bearing 12. On the interior of the drive tube 11 are longitudinal keyways 13. A boring bar assembly 14 extends within the drive tube 11 and the upper end of the boring bar 14 is provided with an internally threaded collar 15 having external drive keys 16 which operate within the keyways 13 on the interior of the drive tube 11. The boring bar 14 extends through a stuffing box 17 at the lower end of the skeleton frame 10, the stuffing box being removable fixed in fluid-tight relation by adaptor 18 to the adaptor flange 53 which is bolted to gate valve 19 previously attached to a nipple 20 welded to the pipe 21.

A tubular feed screw 22 extends within the drive tube 11 and into the threaded collar 15. A retainer shaft 23 slidably extends within the tubular feed screw 22 and into boring bar assembly 14. The lower end of the retainer shaft 23 includes threaded means 24 for receiving interchangeably the stem 25 of a tapping cutter 26 and the stem 25a of a plug 27.

A gear housing 28 is fixed to the upper end of the skeleton frame member 10. Likewise, the upper ends of the feed screw 22 and of the drive tube 11 are rotatably supported in bearings at the upper end of the skeleton frame 10. The drive tube 11 is rotated by a worm gear 29 which is driven through worm 39 by a hand crank 30 or motor 31. The rotation of the drive tube 11 is imparted by sprocket 33, a clutch 32, and feed screw sprocket 34 which is fixed to the upper end of the feed screw 22 within housing 28.

The steel rod or retainer shaft 23 telescopes within the feed screw 22 and into the stuffing box 35 and socket 36 at the lower end of the boring bar 14. Threads 24 on the lower end of the retainer 23 engage the internal threads in the shank 25 of cutter adaptor 37 or similar threads in the shank 25a of the plug 27 to provide positive engagement with the socket 36 of the boring bar 14 during operation. The removable stem 25 is threaded axially by external threads 37a into the cutter member 26. The stem 25 is provided with a squared shank which contains a drilled and tapped bore 24a extending longitudinally into the shank 25 and adapted to receive the threads 24 on the retainer 23. Thus the drilled and tapped shank 25a of the plug 27 and the drilled and tapped shank 25 of the cutter adaptor 37 are interchangeably held within the socket 36 by the threaded retainer shaft 23.

When inserting or removing the plug 27 from the tapping nipple 20, the square shank 25a of the plug 27 is held firmly within the socket 36 of the boring bar 14 by means of the threaded portion 24 of the retainer 23. The stuffing box assembly 35 in the lower end of the boring bar 14 prevents leakage through the bore 38 in the lower end of the boring bar 14.

Within the internally-threaded collar 15, the feed screw 22 passes and telescopes within the boring bar 14. The boring bar 14, in turn, telescopes within the drive tube 11 which is provided with the two internal keyways 13 which are diametrically opposed. These keyways 13 and drive keys 16 cooperate with the threaded collar 15 to extend the boring bar 14 within and below the lower extremities of the drive tube 11 and the stuffing box 17 into nipple 20.

The pipe tapping apparatus can be driven manually or by means of an auxiliary power source such as an air motor. In Figure 3, which is a view taken along the line 3—3 of Figure 1, details are shown of the gear case 28 and assembly which makes it possible to use an auxiliary power means whether it be a hand crank (not shown) or a motor 31. Thus, worm 39 on worm shaft 40 normally is driven by hand crank 30 and, in turn, drives the worm gear 29 which is keyed to the upper end of the drive tube 11. However, by providing auxiliary shaft 41 and drive gears 42 and 43, an auxiliary power source can be removably fixed to the exposed end of the auxiliary shaft 41. In Figure 3 an air motor 31 and transmission 31a are diagrammatically illustrated in position, but it should be understood that a second crank such as hand crank 30 can be used on both shafts 40 and 41.

With this arrangement, the boring bar 14 is rotated by power applied to worm 39, thence to worm gear 29, drive tube 11 and ultimately to boring bar 14 through the threaded collar 15, drive keys 16, and keyways 13 within the drive tube 11.

The drive shaft sprocket 33 which is attached to the drive tube 11 transmits power through a roller chain 44 to sprocket assembly 45 on the counter shaft 46, thence through the clutch 32 to sprocket 48 and through a roller chain 49 to feed screw sprocket 34 which is attached to the upper end of the feed screw 22. Thus, when the clutch 32 is engaged, the power through these four sprockets revolves feed screw 22 simultaneously with the boring bar 14. Since there is a difference in rate of rotation between the feed screw 22 and the drive tube 11 and no longitudinal movement therebetween, the threaded collar 15 is caused to move longitudinally along the keyways 13. The threaded collar 15 is fixed to the boring bar 14 and accordingly the boring bar 14 is moved downwardly through the stuffing box 17 upon rotation of the feed screw 22. The shell cutter 26 is thereby forced into the pipe automatically and in direct proportion to the rate of revolution of the boring bar 14.

With the clutch 32 disengaged by control knob 50, the feed screw 22 may be rotated by hand crank 51 to extend or retract the boring bar 14 for initial adjustment. When the clutch is disengaged, sprocket 48 and hand crank 51 and roller chain 49 cooperate to rotate feed screw sprocket 34 and the feed screw 22 whereby the boring bar 14 can be moved upwardly or downwardly through the gate valve 19 and the nipple 20. The ratio of longitudinal travel with automatic feed of the boring bar 14 is preferably about 0.005 inch per revolution of the boring bar.

The retainer 23 may be a round steel bar which is squared on the upper end for engagement with a socket wrench extension or gage shaft 52 and threaded on the lower end to engage threads in the shank of the plug or the shank on the cutter adaptor. The extension 52 of the retainer 23 can be graduated in inches from 0 to 30. This serves as an indicator to determine the location of the shell cutter 26 when it is extended through the gate valve 19 into position for the drilling operation.

The stuffing box 17 is threaded by means of adaptor nipple 18 to the adaptor flange 53 which is bolted to the gate valve flange 54. The stuffing box 17 is fixed to the body support 10 which surrounds the drive tube 11 and the boring bar 14 passes through the stuffing box 17 and guide nut 55 which is threaded to the lower end of the drive tube 11. The upper end of the body 10 is fixed to the casing 28 through the lower bearing retainer 56 within which is a bearing 12.

Figure 6:
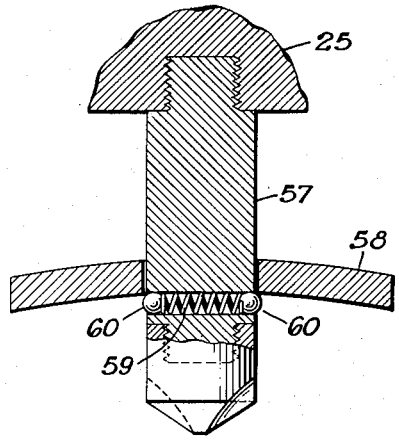
Figure 6 is an elevation, partly in section, showing the details of the pilot drill.
Figure 7:
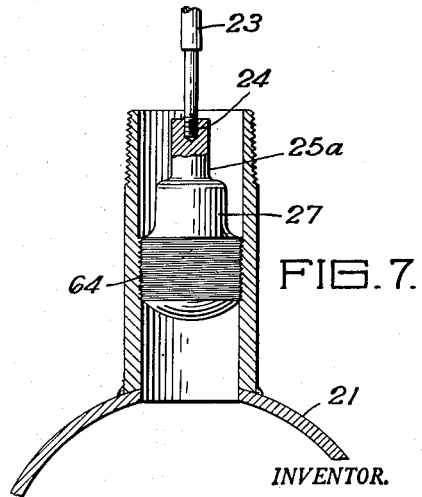
Figure 7 is an elevation, partly in section, of the tubular connector showing the threaded plug in place therein.

Referring to Figures 2 and 6, 57 is a pilot drill extending below the shell cutter 26 in order to pierce the center of the disc section 58 of the pipe or vessel 21 before the shell cutter 26 cuts out the section. The spring 59 urges the balls 60 outwardly a limited distance which is greater than the diameter of the bore cut by the pilot drill 57. With this construction the disc section 58 will be retained on the pilot drill 57 and retrieved when the shell cutter 26 is withdrawn through the nipple 20 and above the gate valve 19.

With the prior art types of pilot drills, the cutting tool could not be withdrawn after the pilot drill had penetrated sufficiently for the engagement of the latch. However, in the operation of pipe tapping machines, it is frequently necessary to withdraw the cutter 26 during the drilling operation due to breakage of the cutter teeth. The spring-loaded balls 60 in the illustrated pilot drill permit the withdrawal of the cutter 26 and pilot drill 57 even after the pipe has been partially cut by the pilot drill 57 and before the cutter 26 has made a complete tapping. Nevertheless, the spring-loaded balls 60 have sufficient tension to retain the coupon 58 on the pilot drill 57 when it has been cut free by the shell cutter 26. By this arrangement, the circular disc is withdrawn rather than dislodged and left in the pipeline. Thus, by this invention a positive means is provided for retrieving or retaining the circular steel disc when the opening is made.

For the smaller sizes of shell cutters, the internal surface 61 may be grooved to accommodate a split ring (not shown) which applies tension to the circular section or disc 58 cut out of the pipe wall during the cutting step.

In operation the nipple 20 is welded to the pipe 21 and the gate valve 19 bolted in place onto the nipple flange 62. The adaptor flange 53 is then bolted to the gate valve flange 54. This assembly is then ready to receive the pipe tapping mechanism. The shell cutter 26 is fixed to the lower end of the boring bar 14 and then by means of nipple adaptor 18, the stuffing box 17 is fixed to the gate valve.

When the tapping operation has been completed, the disc is retained within the shell cutter 26 by the spring-loaded, and diametrically opposed, balls in the pilot drill 57. To withdraw the shell cutter 26 and boring bar 14, the clutch control knob 50 is turned for disengagement of the clutch 32. Thereupon, the countershaft 46 is turned by crank 51 to telescope the boring bar 14 by the rotation of the feed screw 22 while retaining the drive tube 11 in fixed position. The gate valve 19 is closed and the adaptor nipple 18 removed from the adaptor flange 53. The shell cutter assembly, including the cutter 26 and the adaptor 37 with shank 25, is disengaged from the retainer 23 and removed from the squared socket 36. The plug shank 25a is then inserted into the squared socket 36 and threaded to the plug retainer 23 by turning the upper end of the retainer which is provided with a socket wrench engaging means. The adaptor nipple 18 is then replaced upon the adaptor flange 53 and the gate valve opened. The tapping mechanism is fluid- and pressure-tight, and therefore, the boring bar 14 can be lowered through the gate valve adjacent the internally-threaded nipple 20. The threaded plug 27 is then fixed to the internal threads 64 on the nipple 20 by the same mechanism as employed in tapping the pipe. With the plug securely in place, the plug retainer 23 is removed. It will be seen that this retainer 23 can be turned out of the shank 25a of the plug 27 because the shank is held by the squared socket 36 in the lower end of the boring bar 14. Having released the plug retainer 23, the boring bar 14 is retracted by disengaging the clutch 32 and selectively turning the feed screw 22 by hand crank 51 as described above. Finally, the tapping tool is removed from the gate valve flange 54 and, if desired, the gate valve itself and the nipple flange 62 can be disengaged from the nipple 20 and the nipple capped.

When the tapping machine is later used to remove the already installed plug 27, the boring bar 14 is extended through the gate valve 19 and rotated slowly until the socket 36 slips over the shank 25a on the plug 27. The plug retainer 23 is then introduced and threaded into the shank 25a of the plug 27 whereby it is held firmly in the socket 36 of the boring bar 14 to prevent its being accidentally dropped when retracting through the gate valve. The gate valve can then be closed and a branch line attached to the valve.

Although I have described my invention in connection with specific embodiments thereof, it is to be understood that this is by way of illustration only and that my invention is not limited thereto. It is, therefore, contemplated that modifications can be made in my device by those skilled in the art without departing from the spirit of my invention described herein or as defined by the appended claims.

What I claim is:

1. In an apparatus for tapping and plugging a pipe containing fluid under pressure comprising an elongated body, a drive tube axially mounted for rotation within said body, gear means for rotating said drive tube, means for removably fixing the lower end of said body in fluid-tight relation to the exterior of the pipe to be tapped and plugged, a boring bar assembly within said drive tube, an internally-threaded collar at the upper end of said boring bar and adapted for longitudinal movement within said drive tube, a tubular feed screw within said drive tube and engaging said threaded collar, manual means for driving said tubular feed screw, a retainer shaft slidably extending within said tubular feed screw, a socket means on the lower end of said boring bar adapted to receive interchangeably a drilled and tapped stem of a cutter and of a plug, said retainer shaft extending into said socket, and thread means on the lower end of said retainer shaft for engaging said stem, said socket and retainer shaft comprising the sole means for rotating said stem and for supporting said stem on said boring bar.

2. An apparatus for tapping and plugging a pipe line containing fluid under pressure which comprises an elongated body member, a bearing at the upper end of said body and a stuffing box at the lower end of said body, a drive tube rotatably supported on said bearing, a boring bar assembly within said drive tube and extendable through said stuffing box, an internally-threaded collar at the upper end of said boring bar and adapted for longitudinal movement within said drive tube, a gear case on the upper end of said body, a first gear within said case keyed to the upper end of said drive tube, a hand crank and worm for driving said gear, a hollow feed screw extending axially within said drive tube and engaging said threaded collar, a second gear keyed to the upper end of said feed screw within said case, a hand crank for independently rotating said feed screw, a clutch and drive means within said case affording a drive connection between the upper ends of said drive tube and said feed screw, a socket at the lower end of said boring bar, a bore extending between said socket and said boring bar, a retaining shaft slidable within said hollow feed screw and extending through said bore into said socket, a shell cutter having a drilled and tapped stem within said socket, and thread means on the lower end of said retaining shaft for engaging said stem, said socket and retainer shaft comprising the sole means for rotating said stem and for supporting said stem on said boring bar.

3. In an apparatus for cutting and plugging a pipe containing fluid under pressure comprising an elongated frame member, a tubular drive member rotatably mounted within said frame member, a boring bar assembly within said tubular drive member, longitudinal keyways on the interior of said tubular drive member, a tubular feed screw extending within said boring bar assembly and in threaded engagement with an upper portion thereof, longitudinal keys on the exterior of said boring bar adapted to travel longitudinally within said keyways, a retainer shaft slidably extending within said tubular feed screw and adapted to retain interchangeably the stem of a cutter and the stem of a plug, and a floating gage shaft within said feed screw with its lower end on the top of said retainer shaft and its upper end extending to a point above the upper end of said feed screw.

4. An apparatus for tapping and plugging a pipe containing fluid under pressure which comprises an elongated body, a drive tube axially mounted for rotation within said body, gear means for rotating said drive tube, a boring bar assembly adapted for longitudinal movement within said drive tube, an internally-threaded collar at the upper end of said boring bar, a tubular feed screw within said drive tube and engaging said threaded collar, manual means for driving said tubular feed screw, a retainer shaft slidably extending within said tubular feed screw, socket means on the lower end of said boring bar adapted to receive interchangeably a drilled and tapped stem of a cutter and of a plug, the lower end of said retainer shaft extending into said socket and engaging said stem, a floating gage shaft removably supported on the top of said retainer shaft within said feed screw and its upper end extending to a point above the upper end of said body, and markings on said gage shaft to indicate the position of said retainer shaft.

5. An improved shell cutter assembly provided with a retractable pilot drill which comprises an annular cutter member, a removable stem threaded axially into said cutter member, a squared shank on said stem, a first drilled and tapped bore extending longitudinally into said shank, a second drilled and tapped bore on the opposite end of said stem within said cutter member, a pilot drill shank threaded into said second bore and extending below the cutting edges of said cutting member, a transverse bore extending through said pilot drill shank below the cutting edges of said cutting member, and spring-loaded balls within said transverse bore laterally extendable from the said pilot drill.

References Cited in the file of this patent

UNITED STATES PATENTS

| Number | Name | Date |
| --- | --- | --- |
| 20,469 | Daggett | June 1, 1858 |
| 438,740 | Eley | Oct. 21, 1890 |
| 485,715 | Smith | Nov. 8, 1892 |
| 856,650 | Mueller | June 11, 1907 |
| 1,007,882 | Markley | Nov. 7, 1911 |
| 1,216,284 | Cash | Feb. 20, 1917 |
| 1,234,455 | Fox | July 24, 1917 |
| 1,743,333 | Field | Jan. 14, 1930 |
| 1,796,077 | Boosey | Mar. 10, 1931 |
| 1,956,129 | Mueller et al. | Apr. 24, 1934 |

FOREIGN PATENTS

| Number | Country | Date |
| --- | --- | --- |
| 282,475 | Germany | Mar. 16, 1915 |
| 640,646 | France | Apr. 2, 1928 |